Aug. 10, 1926.
O. B. SATHER
1,595,424
HIGH PRESSURE HAND LUBRICATING PUMP
Filed Dec. 5, 1924
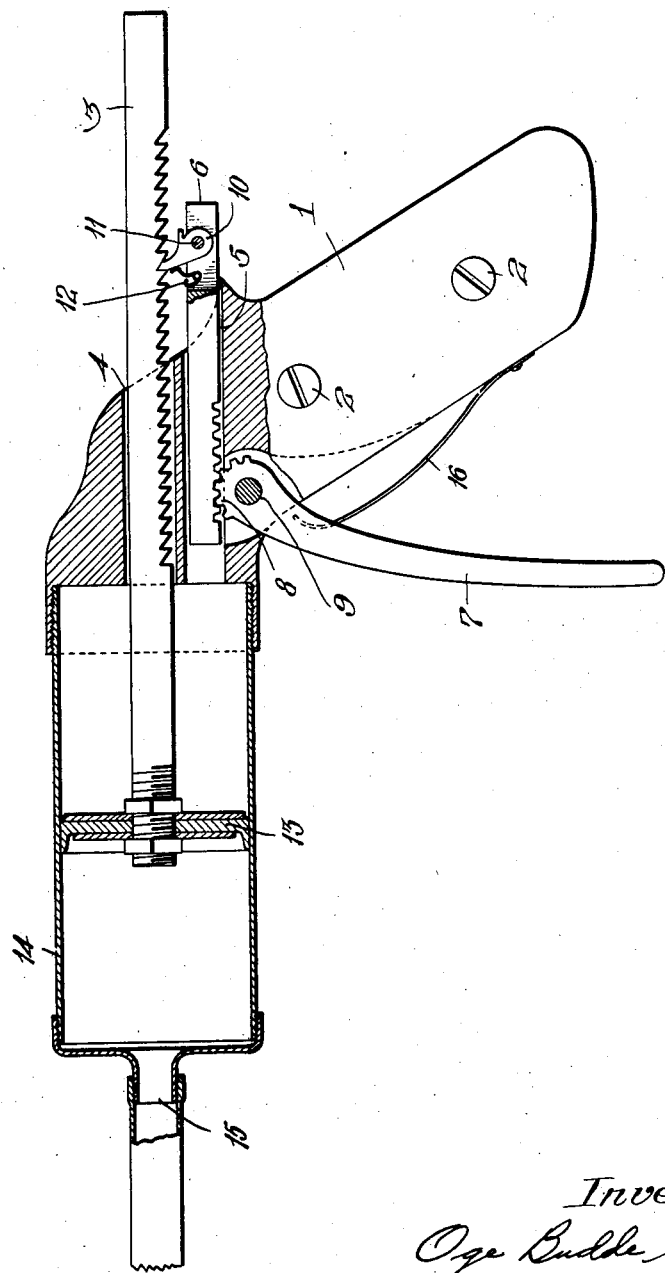
Inventor:
Oge Budde Sather Patented Aug. 10, 1926.

1,595,424

UNITED STATES PATENT OFFICE.

OGE BUDDE SATHER, OF MINNEAPOLIS, MINNESOTA.

HIGH-PRESSURE HAND LUBRICATING PUMP.

Application filed December 5, 1924. Serial No. 754,158.

The invention relates to improvements in high pressure hand lubricating pumps for automobiles and other machinery; and the objects of the improvement are; first, to provide a tool that can be operated with one hand which is desirable when working in places where space is limited, such as underneath and around the machinery of an automobile; second, to provide more speed with less physical effort in high pressure lubrication.

One form of the invention is illustrated in the accompanying drawing, which is an elevation partly in section of the machine.

The handle 1, constitutes the framework of the machine which is in two parts' secured together by bolts 2—2.

The stem to the plunger 3, of the pump runs in a slot or guide 4, in the handle.

There is also another slot or guide 5, in the handle, just below 4, and running parallel to it in which slides a rod 6, in which there are cog teeth cut on the bottom side.

The lever or trigger 7, which operates the machine has a round end with cog teeth 8, to engage with cog teeth cut in rod 6. There is a hole in the lever 9, and a bolt running through the handle and through the hole in the lever forms the pivot on which the lever works back and forth and in so doing the cog teeth 8, in lever 7, engages with cog teeth in rod 6, moves rod 6, back and forth parallel to plunger stem 3.

There are notches cut into one side of plunger stem 3, in the shape of saw teeth.

There is a lug 10, in the rear part of rod 6, with a pin 11, running through it and through rod 6, holding it there loosely so that it may swing up and down.

There is a spring 12, on lug 10, which holds one end of it up against plunger stem 3, and engaging it with same, so that when lever 7, is pulled it will also draw rod 6, into handle and lug 10, being fastened to rod 6, will engage with teeth in plunger stem 3, and force that to travel in the same direction thereby pushing the plunger 13, through cylinder of pump 14, and forcing contents of pump out through the discharge connection 15.

There is a spring 16, behind lever 7, to keep it pushed out in charging position so that the operator will only have to pull it one way, the spring returning it to its original position.

When the lever, or trigger 7, is pulled into handle 1, it forces plunger 13, into pump, but when the handle comes back the other way lug 10, slips by the saw teeth in plunger stem 3, so that plunger stem only works one way by pulling lever 7.

For refilling the pump, lug 10, will have to be pushed down so it is disengaged from plunger stem 3, and then the plunger can be pulled back.

By reason of the long lever 7, it is possible to force lubricants where wanted with great pressure and not much physical effort on the operator's part.

I am aware that prior to my invention lubricating pumps have been made with a plunger that works with a straight push of the hand on the plunger stem or having screw threads cut in the plunger stem and engaging with threads cut in the rear part of pump for securing greater pressure. I therefore do not claim such a combination broadly; but

I claim:

A lubricating gun having an outlet at one end, a piston in said gun a rack attached to said piston, a handle attached to the other end of said gun, a spring-pressed rod pivoted in said handle, a gear formation on said rod concentric with said pivot, a pitman, means on said pitman for driving said rack in one direction only, said gear formation engaging said pitman to actuate the piston.

OGE BUDDE SATHER.